United States Patent [19]

Bleckmann

[11] 4,332,080
[45] Jun. 1, 1982

[54] METHOD OF PRODUCING A HEATER OR HEAT EXCHANGE ELEMENT

[76] Inventor: Ingo Bleckmann, Ignaz-Rieder-Kai 11, A-5020 Salzburg, Austria

[21] Appl. No.: 223,014

[22] Filed: Jan. 6, 1981

[30] Foreign Application Priority Data

Jan. 8, 1980 [EP] European Pat. Off. ......... 80100081.1

[51] Int. Cl.³ .......................................... B23K 21/00
[52] U.S. Cl. ............................. 29/611; 29/157.3 AH
[58] Field of Search ........ 29/611, 157.3 AH, 157.3 R, 29/157.3 A; 113/118 A; 219/542, 536, 463, 436, 438; 165/185

[56] References Cited

U.S. PATENT DOCUMENTS 2,691,813 10/1954 Polad .
2,693,026 11/1954 Simpelavar ................. 113/118 A X
2,778,610 1/1957 Bruegger .................... 113/118 A X
3,774,295 11/1973 Conlee ......................... 29/157.3 AH
4,066,201 1/1978 Bleckmann ........................... 29/611
4,103,408 8/1978 Joekel ......................... 29/157.3 AH

FOREIGN PATENT DOCUMENTS 369 7/1978 European Pat. Off. .
1181855 1/1959 France .

Primary Examiner—Leon Gilden
Attorney, Agent, or Firm—Fleit & Jacobson

[57] ABSTRACT

To produce a heater or heat exchange element, a wire coil is wound around a pipe, in a stressed condition. When the pipe is pressed on to a heat-transfer and support element, the projections formed by the wire coil penetrate into the support element and are anchored therein. Suitable selection in respect of the hardness of the materials used makes it possible for the portions of the wire coil which are remote from the support element to be pressed flat until they come into at least approximately contact with each other, producing a form of protective shell which also improves heat transfer between the pipe and the support element.

14 Claims, 12 Drawing Figures

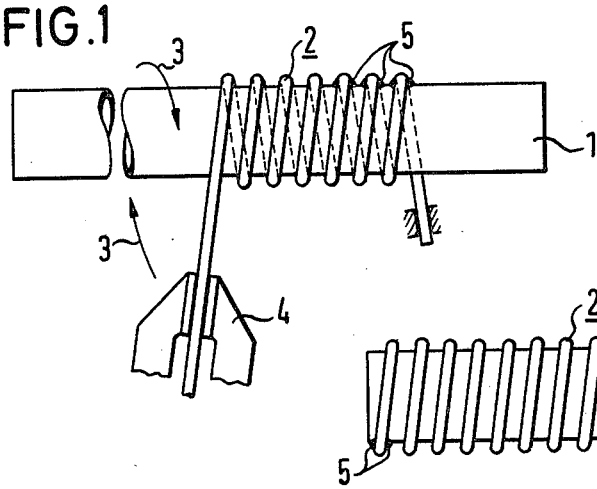
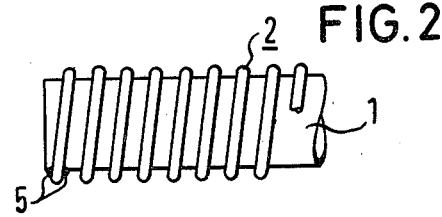
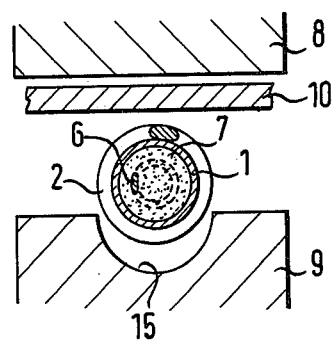
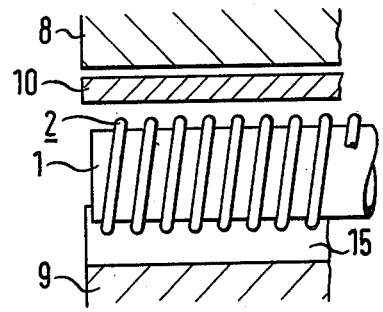
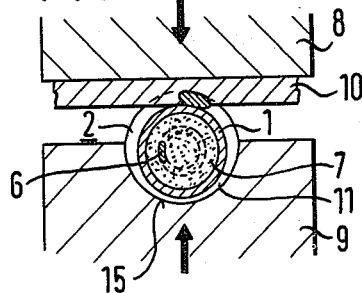
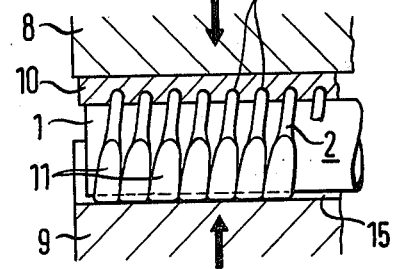

METHOD OF PRODUCING A HEATER OR HEAT EXCHANGE ELEMENT

BACKGROUND OF THE INVENTION

There are various forms of heating devices or heat exchange elements, comprising a pipe which contains an electrical resistance heating means or which carries a liquid or gaseous heat exchange agent, and a support member such as a panel or plate, to which or from which heat is passed or removed to produce the heat-emission or heat exchange function. It is necessary for the pipe structure to be secured to the support members such as a support plate or for example the bottom of a cooking or frying pan by a strong connection giving a long service life. In addition, however, it will be appreciated that the maximum level of heat transfer between the components is also of particular importance in order to arrive at a high degree of efficiency in the heat-emission or heat-transfer function. Both these conditions, namely a firm connection and a good heat transfer action, can be achieved by soldering or welding the pipe to the support plate. However, not only are soldering or welding operations of this kind expensive, but furthermore when the assembly comprises a pipe made by rolling a metal strip into a tubular form and welding or soldering the edges together, there is the danger that the resulting seam may come apart in the operation of welding or soldering the pipe to the support. Although this problem can be avoided by using seamless pipes, such pipes are too expensive for the more common uses of such assemblies.

In regard to electrical heating, cooking or frying equipment in which one or more tubular heaters are secured to a support panel for enhanced heat emission and radiation or to the vessel for receiving the items to be cooked or fried, there is also the difficulty that a not inconsiderable part of the heat produced by the heater is usually radiated from the side thereof which is remote from the support panel or vessel. Apart from the resulting loss of heat energy, there is a higher risk of fire if a heater burns through, particularly if the heater is disposed in a housing of plastic material. To reduce the heat losses, cover plates may be disposed around the heater but the production costs of such an assembly are substantially higher as the cover plates must in turn be secured to the support plates or to the bottom of the cooking vessel.

SUMMARY OF THE INVENTION

An object of the invention is to provide a method of producing a heating device or heat-exchange element, which does not suffer from the above-discussed disadvantages.

A further object of the invention is to provide a method of producing a heating device or heat-exchange element, which combines good heat transfer with a strong and firm fixing between the pipe and a support member.

A still further object of the invention is to provide a method of producing a heating device or heat-exchange element, wherein the surface of the pipe which is remote from the associated support element is protected from damage.

Yet another object of the invention is to provide a method of producing a heating device or heat-exchange element, wherein heat which is radiated from the heating element of the assembly in a direction away from the support element is restored thereto.

These and other objects are achieved by a method of producing a heating device or heat-exchange element, comprising a pipe adapted to contain an electrical resistance heating means or to carry a liquid or gaseous heat exchange agent, and a support member for supporting the pipe and for enhancing heat transfer to or from the pipe. In performing the method, a wire is wound in a coil configuration around the pipe structure adapted to carry the electrical heating means or the heat exchange agent. The material of which the pipe is made is harder than the material of the wire. The resulting assembly of pipe and coiled wire is then pressed on to a support made of a material which is softer than the material of the pipe and the material of the wire. The pressure applying the pipe and the support together is adapted to the hardness of the material forming the support element so that the turns of the wire coil, which penetrate into the support element under the pressing force, are embraced by the material of the support element, due to the material of the support flowing around the turns of the wire coil, thus producing an anchoring effect securing the wire coil in the support, thereby to secure the pipe to the support. At locations on the wire which are remote from the support, the wire is flattened in its cross-section so that the edges of the flattened portions of the turns of the wire coil come at least approximately into contact with each other.

When the pipe is intended to carry a liquid or gaseous heat exchange agent, an internal mandrel is inserted into the pipe in order substantially to prevent deformation of the pipe during the pressing operation. The support and/or the pipe with the wire wound therearound may be heated before or during the pressing operation, in order to facilitate the operating procedure. The pitch of the wire coil is preferably so selected that the distance between respective turns of the coil is approximately from one to five times the diameter of the wire. The wire may also be connected as by welding to the pipe, at at least one location thereon. For example, the wire may be connected to the peripheral surface of the pipe by spot welding at the respective ends of the pipe.

A panel heater for space heating purposes may be formed by means of a panel or plate to which one or more electrical tubular heaters is or are secured, in accordance with a method as set forth above. Thus, the or each tubular heater carries a wire coil which is wound in a pre-stressed condition around the pipe of the heater. The wire coil is anchored in the plate of the panel heater, thereby to secure the pipe of the heater to the support panel, while at the side remote from the panel the wire is pressed at least partly towards a flat condition so that the surface of the tubular heater is at least partially or almost entirely covered by the wire where it is pressed substantially flat.

The method of the invention may also be used for example in the production of an electrical cooking or frying appliance comprising a vessel for receiving items to be cooked or fried, with an electrical tubular heater secured thereto. The heater may comprise a pipe around which a wire coil is wound in a pre-stressed condition, the wire being anchored in the bottom and/or a side wall of the vessel. The side of the turns of wire, which is remote from the vessel, is pressed into a substantially flat condition so that the surface of the tubular heater is again at least partially covered by the wire where it is pressed substantially flat.

Furthermore the method of the invention may be used for example in the production of heat exchange elements for solar heating systems, heat pump heating installations or evaporator systems, which comprise a heat exchange panel and one or more pipes which may be straight or bent for example into a hairpin-like configuration. Each of the pipes carries a wire coil which is wound therearound in a pre-stressed condition and which is anchored in the panel. The side of the wire turns which is remote from the heat exchange panel is pressed into a flattened condition so that the associated surface of the pipe is at least partially covered by the flattened wire.

BRIEF DESCRIPTION OF THE DRAWINGS

FIG. 1 is a diagrammatic view illustrating the production of a pipe assembly provided with a wire coil, FIG. 2 shows a side view of part of the pipe assembly with wire coil shown in FIG. 1, FIG. shows a view in cross-section of a pressing arrangement before a pipe is pressed on to a support plate or panel, FIG. 4 shows a side view of the FIG. 3 pressing arrangement, FIG. 5 shows a view in cross-section of the pressing arrangement of FIG. 3 at the end of a pressing operation, FIG. 6 shows a view corresponding to FIG. 4 of the pressing arrangement at the end of the pressing operation.

DESCRIPTION OF THE PREFERRED EMBODIMENTS

Figure 7:
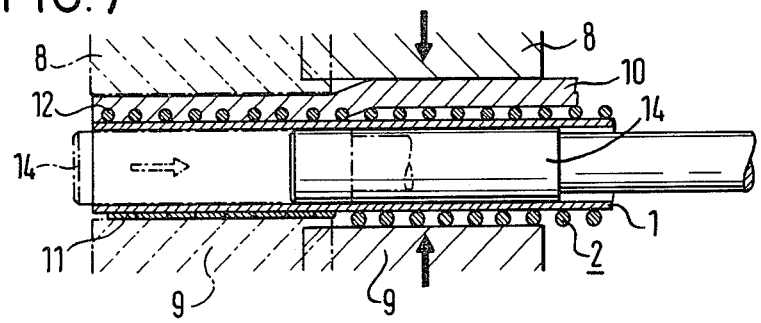
FIG. 7 shows a sectional side view of a pressing arrangement by means of which a pipe with wire coil is pressed on to a support plate or panel, in respective sections along the length of the pipe.

Reference is first made to FIG. 1 which shows an assembly comprising a pipe 1 which, in the final product, may contain an electrical resistance heating means or may carry a liquid or gaseous heat exchange agent. A wire 2 is wound in coil form under a suitable stress around the pipe 1, by means of a winding apparatus 4 rotating about the axis of the pipe 1 in the direction indicated by arrow 3. A small number of turns or windings of the coil, for example three thereof, are connected to the peripheral surface of the pipe by spot welds 5 produced by a suitable welding device (not shown). The next weld location (this is not shown in FIG. 1) is then formed at a spacing from the previously mentioned spot welds 5, which spacing corresponds to the length of pipe portion to be produced. Thus, a length of pipe has a wire coil wound therearound, with the wire coil being secured to the peripheral surface of the pipe at a plurality of spaced locations, the spacing corresponding to the length of pipe portions which are to be produced from the length of pipe. The pipe portions are then cut to length from the above-mentioned pipe by means of a suitable severing or cutting device (not shown), which makes a cut at the middle of the weld location formed by the spot welds 5. This therefore results in pipe portions in which the wire coil is welded to the peripheral surface of the pipe 1, at each end of the resulting pipe portion. It will be appreciated therefore that the coil is free between the weld locations 5, that is to say, it is not attached to the pipe but is simply wound therearound in a pre-stressed condition.

As briefly referred to above, a heating coil 6 (see FIGS. 3 and 5) comprising an electrical resistance heating wire may be introduced into the pipe before or after the wire coil 2 has been wound therearound. The heating coil 6 is suitably embedded in an electrical insulating material indicated at 7 in FIGS. 3 and 5.

Reference is now made to FIGS. 3 through 6 which show that the resulting tubular heater may be secured to a support element such as a carrier plate or panel 10, by means of an arrangement comprising pressing tools 8 and 9. In the pressing operation, the lips or ridges formed by the turns of the wire coil are pressed into the material of the plate 10 so that the wire coil is anchored in the material of the plate 10, thereby firmly securing the tubular heater to the plate. In addition, in the pressing operation, portions of the wire 2 at the side of the pipe 1 remote from the plate 10 are pressed into a substantially flat condition, the flattened portions of the wire being indicated at 11 in FIGS. 5 and 6. In order for this to be satisfactorily produced, there are a number of conditions to be fulfilled:

The hardness of the material of the wire 2 must be greater, preferably for example from four to six times, than the hardness of the material forming the plate 10. Thus, for this reason, the plate or panel 10 will preferably comprise aluminium, an aluminium alloy or copper.

In addition, the pitch of the coil should be such, relative to the diameter of the wire, as to permit the turns to be flattened as at 11, in order to come at least partially into contact with each other; thus, as a preferred condition, the pitch of the wire coil should not be so large in relation to the diameter of the wire, for example the distances between the centre lines of each turn or winding of the wire coil should be about one or two to five times the diameter of the wire, but preferably three times the wire diameter.

Furthermore, the material of the wire 2 must be no harder and preferably less hard than the material of the pipe 1.

Figure 8:
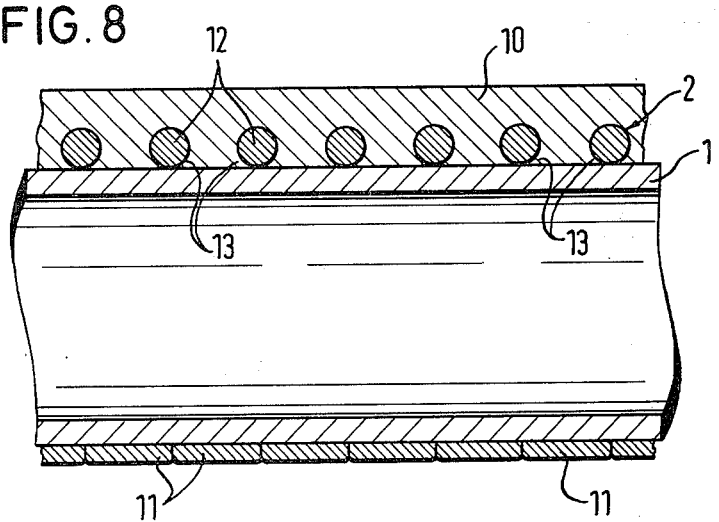
FIG. 8 shows a view on an enlarged scale and in section of the finished product resulting from the operation of FIG. 7.

Under these conditions, the ridges or lips 12 formed by the turns or windings of the wire coil, which lie against the plate 10, penetrate into the material of the carrier plate 10, in the pressing operation, as can be seen from a comparison between FIGS. 3 and 5, and between FIGS. 4 and 6. As the turns of the wire coil penetrate into the material of the plate 10 under the effect of the pressing force applied by the pressing tools 8 and 9, the material of the plate 10 is displaced parallel to the axis of the pipe 1 by the respective turns of the coil, with the diameter or width therefore increasing under the pressure, and the plate material is thus pressed into the undercut portions 13 (see FIG. 8) formed between the respective turns of the coil and the adjacent surface portion of the pipe 1. It will be clearly seen for example from FIG. 8 that the turns of the coil are firmly embedded in the material of the plate 10.

It has been found in practice that the undercut portions 13 are completely filled with material of the plate 10 if the above-specified conditions are fulfilled, so that the turns 12 are accordingly firmly anchored in the plate 10. The fact that the wire 2 is only wound around the pipe 1 in a pre-stressed condition, that is to say, it is welded to the pipe 1 only at restricted locations, without being secured to the pipe 1 between the abovementioned weld locations 5, is particularly advantageous from this point of view. Thus, it is found that the loose turns of the wire coil 2 may be displaced somewhat on the pipe 1 in the pressing operation, thereby providing a compensation action in respect of any differences in the pressure applied, along the length of the coil. If therefore an undercut portion 13 at one side of a turn 12 of the coil is already filled with plate material when the undercut portion on the opposite side of the same turn is not yet completely filled with material, then the turn in question will be displaced somewhat in the direction of the undercut portion which has not yet been properly filled with material of the plate 10, whereby both those undercut portions 13 will be satisfactorily filled with such material. This means therefore that, in the pressing operation, the turns of the coil may move axially of the pipe by small amounts until all the above-mentioned undercut portions 13 are properly filled whereby the pipe is properly anchored to the plate 10.

As the turns 12 of the coil are now fixedly anchored in the plate 10, thermally induced stresses are compensated by the pipe 1 being capable of moving within the wire coil. It has been found in practice that, in a tubular heater to which a wire coil is secured by soldering all along the length thereof and which is secured to the bottom of a frying or roasting pan by the turns of the wire coil being pressed into the support element without the application of heat, the thermal stresses which are produced when the pan is heated or in particular abruptly cooled, have the result that the turns 12 of the coil tend to work themselves out of their anchoring in the bottom of the pan, in the course of time. This disadvantageous effect does not occur with the construction illustrated in the drawings, in which the wire coil 2 is secured to the pipe 1 by welding or soldering only at the ends thereof, with the remainder of the wire coil 2 being unattached to and thus displaceable on the pipe 1.

As mentioned above, the material of the pipe 1 is to be harder than the material of the wire 2. When this condition is fulfilled, the turns of the coil are pressed into a substantially flat condition, or are at least partially flattened, after the turns 12 have penetrated into the material of the plate 10. The flattened portions are indicated at 11 in FIGS. 5 and 6. This flattening of the wire, which takes place at the side of the pipe assembly which is remote from the plate 10, may be to such an extent that the edges of the flattened portions of the wire, which thus assume a generally strip-like configuration (see also FIG. 8) touch each other, although a close approximation to contact therebetween may be found to be satisfactory. This arrangement therefore forms a kind of protective sleeve or shell to protect the tubular heater, while performing various functions as indicated below:

The radiation heat loss of the tubular heater is approximately half that of a tubular heater which is not protected by a protective sleeve formed by flattened wire portions in the above-described manner. The wire 2 therefore serves as a heat transfer means, that is to say, at least a substantial proportion of heat which is radiated from the side of the tubular heater remote from the carrier plate 10 flows into the plate 10 by way of the embedded turns 12 of the wire coil 1.

When a tubular heater generally is used in connection with housings or containers comprising plastic material, as referred to above, there may be a considerable fire risk if the heater is disposed in the container or housing without some form of protection. Because of general overheating, for example in the event of failure of a thermostatic control or due to local overheating, the surface of the tubular heater may reach a temperature at which molten material issues therefrom. A similar situation may also arise if a tubular heater burns through towards the exterior, that is to say, if an arc or electric contact is formed between the heating coil 6 and the casing of the pipe 1. Now, the flat-pressed portions 11 of the turns of the wire coil 2 act as protection, that is to say, they trap any molten material from the heater and prevent overheating of the plastic container or vessel due to heat radiation. This means therefore that, where protective plate members as referred to above were previously provided in order to protect the tubular heater and prevent it from causing damage, such protective plate members may be omitted, thereby resulting in a price saving which is a considerable factor in regard to mass-produced articles, particularly when it is borne in mind that the protective plate members must be secured to the plate 10 or other support element as by soldering or welding, which thus involves a further complicated and consequently expensive operation.

The effect of improved heat transfer which is achieved by the structure according to the present invention is also of major significance in cases in which the pipe 1 carries a flow of liquid or gaseous heat exchange agent, for example in heat exchangers for solar systems, evaporator assemblies for refrigerators, and the like.

To produce such a heater, in which it will be appreciated the pipe 1 must be kept open in order to permit a satisfactory flow therethrough of fluid heat exchange agent, it is important that the pipe 1 should not be subjected to pressure sufficient to cause even at least partial crushing thereof, as this would impede the flow of heat exchange agent therethrough. It will be appreciated that, in the operation as shown for example in FIGS. 3 through 6, the heating coil 6 and the material 7 in the interior of the pipe 1 contribute substantially to preventing crushing or deformation of the pipe 1. Where however the pipe 1 is not filled in this way, substantial pressure applied by the pressing tools 8 and 9 could result in deformation of the pipe 1, with the above-mentioned disadvantageous consequences. Therefore, in order to ensure that the pipe 1 for carrying a fluid heat exchange element is not crushed in this way, an internal mandrel 14 is inserted into the pipe 1, as shown in FIG. 7. With such an arrangement, the operation of pressing the assembly comprising the pipe 1 and the wire coil 2 wound therearound to a support element such as a plate 10 may be effected in sections along the pipe; in other words, the plate 10 is first pressed into anchoring contact with the pipe 1 over a portion of the length thereof. Then, when that pressing operation is concluded, the pipe 1 together with the mandrel 14 disposed therein are advanced through the pressing tools 8 and 9, until the pressing tools are aligned with a portion of the plate 10 which has not yet been pressed into anchoring connection with the pipe-and-coil assembly 1, 2. The mandrel 14 is then retracted through the pipe by the same distance as the previous advance movement of the pipeand-coil assembly, so that the mandrel 14 is in a position within the pipe 1, which corresponds to the fresh position of the pressing tools 8 and 9 relative to the pipe.

It may occur for various reasons that the materials of the respective components 1, 2 and 10 cannot be adapted to each other to fulfill the abovementioned conditions, in the cold condition. In such a case, the materials may be brought into a condition of being substantially so adapted to each other, thus fulfilling the above-indicated conditions, by heating one or more of the respective components, for example the plate 10, before or during the pressing operation.

Figure 9:
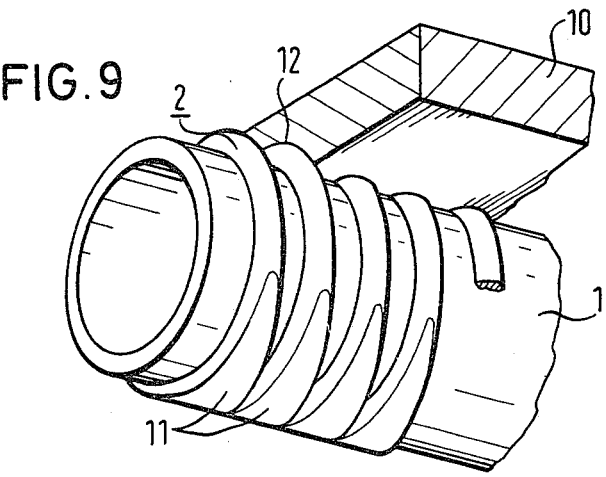
FIG. 9 shows a diagrammatic perspective view of part of the finished assembly.

The pressing tools 8 and 9 are adapted to the particular purpose that they are required to perform. As illustrated, the pressing tool 9 has a cavity or recess 15 which is of semi-circular cross-section, and the pipe 1 with wire coil 2 wound therearound is laid into the recess 15. The recess 15 causes the turns of the wire 2 to be pressed into a substantially flat condition over a substantial portion of the periphery of the wire coil, thus forming the protective sleeve or cover which is thus of semi-tubular shape. This configuration can be seen from FIG. 9.

Figure 10:
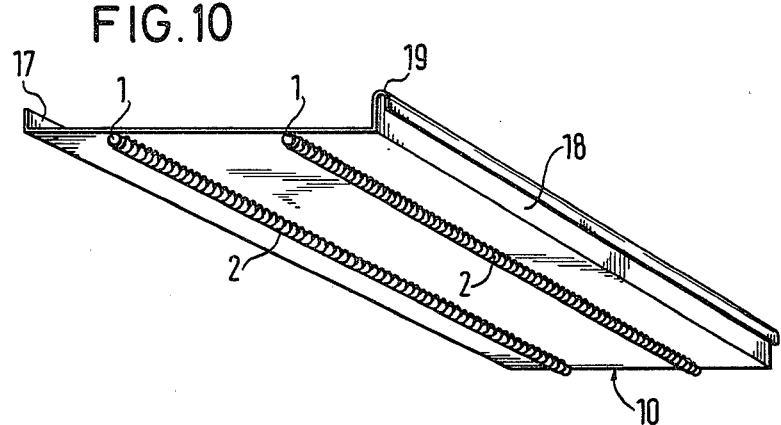
FIG. 10 shows a diagrammatic perspective view of a heat exchange element for a solar roof.
Figure 11:
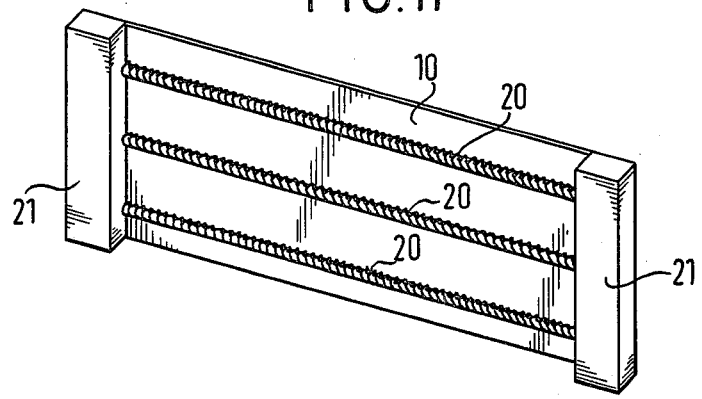
FIG. 11 shows a diagrammatic perspective view of a panel heater for space heating.
Figure 12:
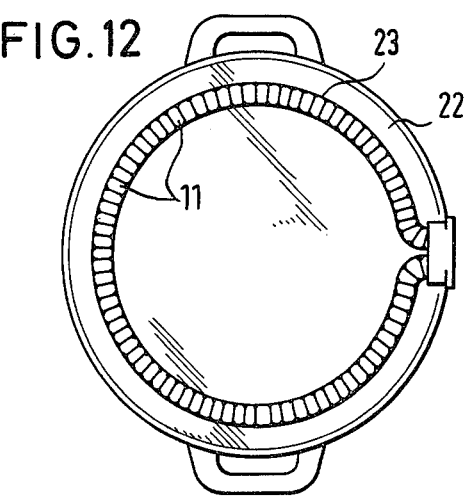
FIG. 12 shows a view from below of an electrically heated cooking pan.

Reference is now made to FIGS. 10, 11 and 12 which respectively show an assembly produced in the above-described manner, when forming part of a heat exchange element for a solar roof (FIG. 10), a panel heater for space heating (FIG. 11), and an electrically heated pan (FIG. 12). Thus, in FIG. 10, the assembly comprising the pipe 1 and the wire coil 2 is secured to a carrier plate 10 which also has an edge flange 17 for abutting against a corresponding portion of another solar roof element, and a further edge flange 18 with bent-over portion 19 for forming a sealed connection to another corresponding element.

In FIG. 11, the tubular heater comprises a pipe and coil assembly indicated at 20, for carrying a flow of fluid or gaseous heating agent. The assembly 20 is secured to a support element 10, and connected to collecting conduits or manifolds as indicated at 21.

In FIG. 12, a tubular heater which incorporates an electrical resistance heating means is secured to the bottom 22 of a frying, boiling or like pan, in an annular configuration 23.

It will be appreciated that the foregoing description is given solely by way of example of the present invention which is not therefore limited thereto, and various modifications may be made without thereby departing from the spirit and scope of the present invention.

I claim:

1. A method of producing an assembly comprising a pipe adapted to perform a thermal function and a support means to which the pipe is secured for transfer of heat therebetween, wherein wire is wound in a pre-stressed condition and in a coil configuration around the pipe, whereby the turns of the wire coil form projections on the surface of the pipe, the hardness of the material forming the pipe being greater than the hardness of the material forming the wire; wherein the resulting assembly of pipe and wire coil is pressed on to the support means, the hardness of the material of the support means being less than that of the material of the pipe and the material of the wire, the pressing force being adapted to the hardness of the material of the support means whereby said projections are caused to penetrate into the support means and material of the support means flows around said projections thereby anchoring the assembly of pipe and coil to the support means; and wherein, at a location remote from the support means relative to the pipe, the wire is at least partially flattened in cross-section so that the edges of portions of wire which are thus flattened come at least substantially into contact with each other.

2. A method as set forth in claim 1 wherein an internal mandrel is inserted into the pipe before the pressing operation substantially to prevent deformation of the pipe during the pressing operation, thereby to provide an open pipe adapted to carry a flow of fluid heat exchange agent.

3. A method as set forth in claim 2 wherein the pipe is pressed on to the support means in respective portions lengthwise of the pipe.

4. A method as set forth in claim 3 wherein, after a respective portion of the pipe has been pressed on to the support means with the mandrel disposed within said portion, the mandrel is displaced axially within the pipe to a further said portion to be pressed in a subsequent pressing operation.

5. A method as set forth in claim 1 wherein at least one of said components comprising said support means and said pipe with wire coil wound therearound is heated before the pressing operation thereby suitably to adapt the hardnesses of the respective materials to each other.

6. A method as set forth in claim 1 wherein at least one of said components comprising said support means and said pipe with wire coil wound therearound is heated during the pressing operation thereby suitably to adapt the hardnesses of the respective materials to each other.

7. A method as set forth in claim 1 wherein the pitch of the wire coil is such that the distance between respective adjacent windings of the wire coil corresponds to from one to five times the diameter of the wire of the coil.

8. A method as set forth in claim 1 wherein the pressing tool is adapted to the diameter of the pipe and engages about halfway around the periphery of the pipe.

9. A method as set forth in claim 1 wherein the wire coil wound around the pipe is connected to the pipe at spaced positions thereon.

10. A method as set forth in claim 9 wherein said wire is connected to the surface of the pipe at respective ends of the pipe.

11. A method of producing a heater assembly comprising a tubular heater including a pipe and an electrical heating means within the pipe, and a support element to which the tubular heater is secured and which is adapted to receive heat from the tubular heater, comprising the following steps:

(a) a wire is wound in a helical configuration and in a pre-stressed condition around the pipe, the material of the pipe being harder than the material of the wire and the pitch of the coil being adapted to the diameter of the wire;

(b) the assembly of the pipe and the wire wound helically therearound is pressed against the support element, the material of the support element being less hard than the materials of the pipe and of the wire, the pressing force pressing the assembly of the pipe and the wire coil against the support element being adapted to the hardness of the material forming the support element whereby portions of the turns of the wire coil penetrate into the support element and material of the support element flows around said turn portions, thereby anchoring the wire coil to the support element; and (c) at a position on the wire coil on the side of the pipe which is remote from said support element, the cross-section of the wire of the wire coil is flattened by pressing whereby edges of the flattened portions of the wire coil are displaced at least substantially towards each other to at least partially cover the subjacent portion of the surface of the pipe.

12. A method as set forth in claim 11 wherein said portions of the wire coil which are remote from said support element are pressed into a substantially flattened condition such that said edges come at least substantially into contact with each other.

13. A method of producing a heat exchange element comprising a pipe adapted to carry a flow of fluid heat exchange agent, and a support element to which said pipe is secured for transfer of heat therebetween, comprising the following steps:

(a) a wire is wound in a helical configuration and in a pre-stressed condition around the pipe, the material of the pipe being harder than the material of the wire and the pitch of the coil being adapted to the diameter of the wire;

(b) the assembly of the pipe and the wire wound helically therearound is pressed against the support element, the material of the support element being less hard than the materials of the pipe and of the wire, the pressing force pressing the assembly of the pipe and the wire coil against the support element being adapted to the hardness of the material forming the support element whereby portions of the turns of the wire coil penetrate into the support element and material of the support element flows around said turn portions, thereby anchoring the wire coil to the support element; and (c) at a position on the wire coil on the side of the pipe which is remote from said support element, the cross-section of the wire of the wire coil is flattened by pressing whereby edges of the flattened portions of the wire coil are displaced at least substantially towards each other to at least partially cover the subjacent portion of the surface of the pipe.

14. A method as set forth in claim 13 wherein said portions of the wire coil which are remote from said support element are pressed into a substantially flattened condition such that said edges come at least substantially into contact with each other.

* * * * *